US008622026B1

(12) United States Patent
Dole

(10) Patent No.: US 8,622,026 B1
(45) Date of Patent: Jan. 7, 2014

(54) SYSTEM AND METHOD FOR CLEANING TEATS OF A MILK-PRODUCING ANIMAL AND MONITORING TEAT CLEANING PROCEDURES

(71) Applicant: Alpha Technology U.S.A. Corporation, Longwood, FL (US)

(72) Inventor: Kevin Dole, Longwood, FL (US)

(73) Assignee: Alpha Technology U.S.A. Corporation, Longwood, FL (US)

( * ) Notice: Subject to any disclaimer, the term of this patent is extended or adjusted under 35 U.S.C. 154(b) by 0 days.

(21) Appl. No.: 13/689,205

(22) Filed: Nov. 29, 2012

Related U.S. Application Data

(60) Provisional application No. 61/564,578, filed on Nov. 29, 2011.

(51) Int. Cl.
*A01J 7/04* (2006.01)

(52) U.S. Cl.
USPC .......................... 119/651; 119/670; 119/14.18

(58) Field of Classification Search
USPC ................ 119/651, 670, 14.18, 14.03, 14.14, 119/14.08, 14.47, 664
See application file for complete search history.

(56) References Cited

U.S. PATENT DOCUMENTS

| 3,648,696 | A | * | 3/1972 | Keith | 604/310 |
|---|---|---|---|---|---|
| 3,713,423 | A | * | 1/1973 | Sparr, Sr. | 119/670 |
| 4,305,346 | A | * | 12/1981 | Sparr, Sr. | 119/670 |
| 5,211,132 | A | * | 5/1993 | Farina et al. | 119/664 |
| 5,235,937 | A | * | 8/1993 | Farina et al. | 119/664 |
| 6,155,204 | A | * | 12/2000 | van der Lely et al. | 119/14.02 |
| 6,321,688 | B1 | * | 11/2001 | Eriksson | 119/663 |
| 6,325,021 | B1 | * | 12/2001 | Farina | 119/664 |
| 6,343,566 | B1 | * | 2/2002 | Eriksson | 119/14.01 |
| 6,394,038 | B1 | * | 5/2002 | Eriksson | 119/609 |
| 6,550,420 | B1 | * | 4/2003 | Bjork | 119/14.47 |
| 6,591,784 | B1 | * | 7/2003 | Eriksson | 119/670 |
| 6,752,102 | B2 | * | 6/2004 | Dahl et al. | 119/14.47 |
| 7,165,510 | B2 | * | 1/2007 | Hakes | 119/664 |
| 7,178,480 | B2 | * | 2/2007 | Dahl et al. | 119/14.47 |
| 7,882,802 | B2 | * | 2/2011 | Van Den Berg et al. | 119/14.08 |
| 2009/0084324 | A1 | * | 4/2009 | Hiley | 119/652 |

FOREIGN PATENT DOCUMENTS

| EP | 399132 A1 | * | 11/1990 | A01J 7/00 |
|---|---|---|---|---|
| FR | 2559351 A1 | * | 8/1985 | A01J 7/04 |

* cited by examiner

*Primary Examiner* — Yvonne Abbott
(74) *Attorney, Agent, or Firm* — Robert L. Wolter, Esq.; Beusse Wolter Sanks Mora & Maire, P.A.

(57) ABSTRACT

A system for monitoring a teat cleaning and disinfectant before a milking operation is started that comprises one or more controllers that are configured to monitor various operating parameters of the system. In an embodiment, the current supplied to a motor that drives scrubbing elements in an applicator in order to identify or determine when a teat of a cow is inserted and then removed from the applicator during a wash mode and dry mode. The controller is programmed to count each teat that is properly prepped for milking in order to determine the number of cows that have been properly prepped for milking. If certain thresholds, such as predetermined number of teats on a cow, have not been met a cow is not counted as having been properly prepped.

6 Claims, 11 Drawing Sheets

SYSTEM AND METHOD FOR CLEANING TEATS OF A MILK-PRODUCING ANIMAL AND MONITORING TEAT CLEANING PROCEDURES

CROSS-REFERENCE TO RELATED APPLICATIONS

This application claims the benefit of U.S. Provisional Application No. 61/654,578 filed Nov. 29, 2011, and incorporated herein by reference in its entirety.

BACKGROUND OF THE INVENTION

Embodiments of the present invention relate to systems and methods that are used for cleaning teats of milk producing animals.

In typical milking operations around the world the single largest defect of milk as well as the key detractor of profit continues to be mastitis or inflammation of the mammary gland. Mastitis leads to undesirable milk, illness of the animal, compromised immunity as well as reproductive issues and overall animal discomfort. The effects and treatment of mastitis are an age-old knowledge. However, the prevention of mastitis is a rather recent. Since the father of modern microbiology Louis Pasteur developed the germ theory of disease, the general public has assimilated the knowledge that contamination of soil and microbes lead to infection. A logical inference can be made that soiling of an udder of a milking animal by bedding or feces is the most probable cause of mastitis. Therefore, the hygiene of this area via cleaning and treatment with compatible disinfectants is the best prevention.

Udder hygiene has become the cornerstone of mastitis prevention. In recent times there has been a paradigm shift from dairy farmers milking their own cows to employees performing the milking duties. From this change the issue of worker compliance and procedural drift has arisen. To date, worker compliance products efforts have been centered on video monitoring or cumbersome color or fluorescent marker checks. Video does not provide cow-by-cow analysis due to high costs of implementation and high breakdown rates while colorimetric analysis has the potential for contamination of milk and allergic reaction of skin.

Control systems are available to extract data relative to certain milking operating parameters such as milking time or how long a milker is on a cow teat, how long a cow may stay in a holding area before loading the cow, the time related it takes to load cows into a parlor, etc. Based on this data, a dairy farm may identify certain inefficiencies associated with a milking operation in order to increase the number of cows that may be milked during a milking operation. However, to date, the inventors are not aware of a system or method that enables a dairy farm to electronically extract data relative to teat cleaning procedures to analyze such data so dairy farm operators may improve the efficiency of milking operations or monitor compliance with teat cleaning procedures.

DETAILED DESCRIPTION OF THE INVENTION

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained.

Figure 1:
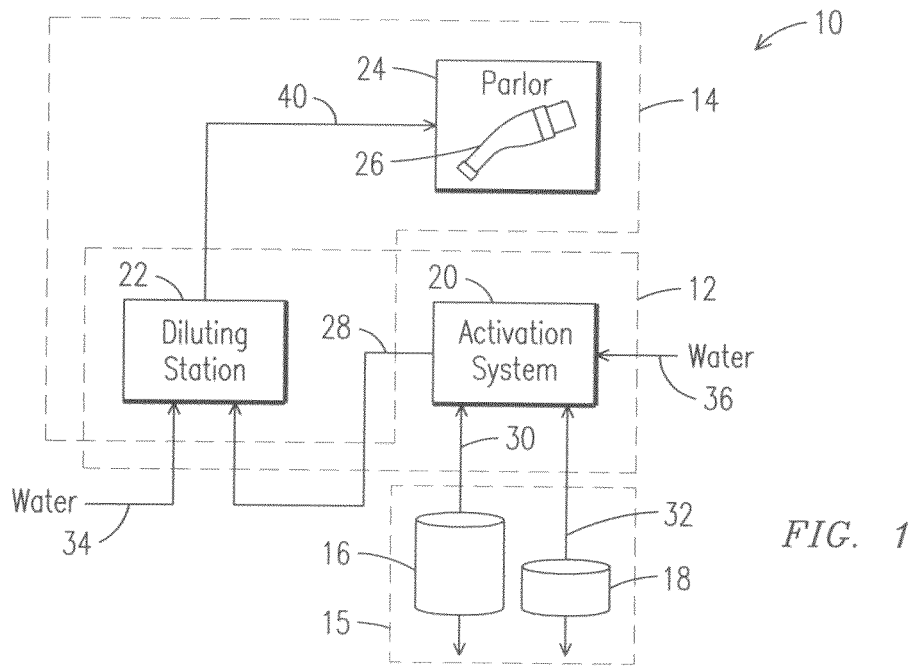
FIG. 1 is a schematic diagram of the system for cleaning teats.

With respect to FIG. 1, there is shown schematically a system 10 for cleaning teats of a milk-producing animal. As shown, the system 10 is configured to deliver an aqueous disinfectant solution to one or more solution applicators 26 positioned in a milking parlor 24 and to the teats of a milk producing animal. The system 10 generally includes a chemical mixing/diluting station 12 at which a concentrated disinfectant is generated by mixing a starter chemical solution with an activator. As disinfectant source is provided including a container 16 of sodium chlorite and a container 18 of the acid activator for generating the concentrated disinfectant, which is diluted as station 12 for delivery to the milking parlor 24. Accordingly, FIG. 1 references a delivery section 14 that includes the solution applicator 26 and may also include components of the mixing/diluting station 12.

While an embodiment illustrates and describes applicators that include a housing attached to a handle, and rotating brushes within the housing to clean teats in the presence of a disinfectant solution, the invention is not limited to the use of rotating brushes. The invention may cover applicators 26 that include other applicator mechanisms that operate remotely relative to a source of disinfectant delivered to the applicator mechanism, which contacts teats and move relative to the teats to scrub and clean the teats in the presence of the disinfectant solution.

The Disinfectant Solution

The disinfectant solution that is applied to the teats is preferably an aqueous chlorine dioxide solution with the concentration of the chlorine dioxide being in the range of about 50 ppm to about 200 ppm. In a preferred embodiment, the concentration of chlorine dioxide is about 125 ppm to about 175 ppm, and preferably about 150 ppm. In addition, the solution does not contain additives such as conditioners, humectants, moisturizers, etc. that may thicken the solution, or increase the viscosity or decrease the vapor pressure of the solution. Accordingly, the solution has a viscosity and/or vapor pressure that are substantially equal to that of water. The estimated vapor pressure of 200 ppm acidified chlorine dioxide solution with a pH 3.00 at 25° C. is about 23.8 mmHg±1 mmHg. The estimated viscosity of the same solution at 20° C. is about 1.002 mPa±0.001 mPa. After cleaning a teat with this solution, the teat may be partially dried so that some residual disinfectant remains on the teat for sublimation or evaporation. This allows the disinfectant to remain in contact with the teat for longer periods of time as compared to prior art solutions. As explained in more detail below, the applicators 26 having rotating brushes mounted within a brush housing that scrub teats while the aqueous disinfectant solution is delivered within a volume of the brush housing and applied to the teats.

Figure 10:
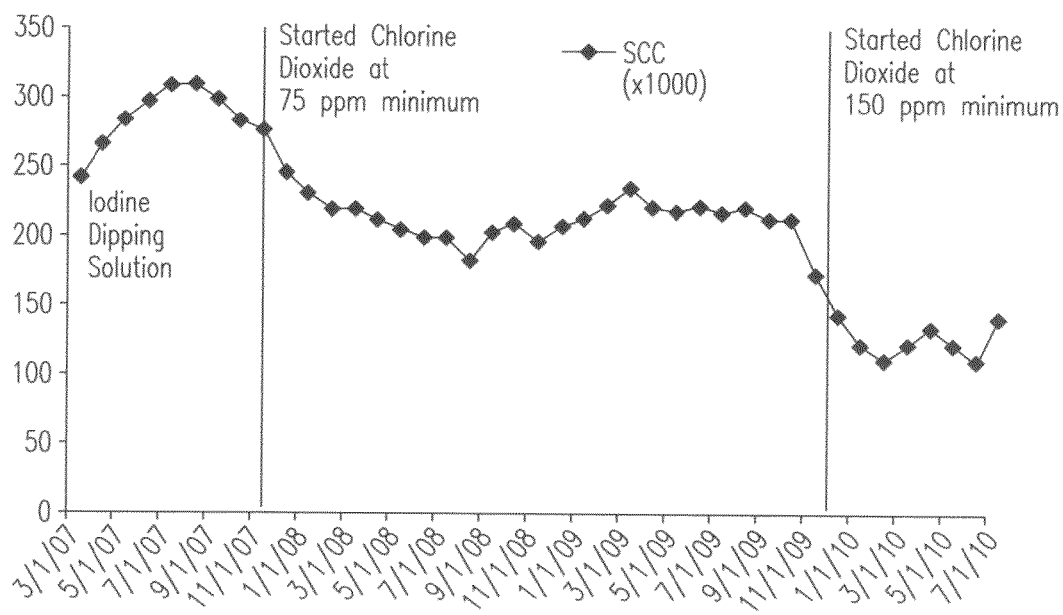
FIG. 10 is a graph showing somatic cell counts using a disinfectant solution comprising a 150 ppm chlorine dioxide solution compared to prior art solutions.

The graph shown in FIG. 10 illustrates somatic cell count test results of the experimental use of the above-described disinfectant with a concentration of approximately 150 ppm of chlorine dioxide used with the below-described teat scrubbing unit having rotating brushes with nylon bristles, and the brushes were rotated at about 500 rpm. Somatic cell count is an indicator of the quality of milk produced. The number of somatic cells increases in response to pathogenic bacteria that may cause mastitis. Somatic cell count is quantified per milliliter.

The somatic cell count results for the disinfectant solution having a concentration of 150 ppm of chlorine dioxide are provided in comparison to a disinfectant solution having a concentration of about 75 ppm of chlorine dioxide. The less concentrated solution also contained one or more additives such as a moisturizer. In addition, the 75 ppm solution was used with a prior art scrubbing unit that had rotating brushes with polypropylene filament bristles being rotated at about 1,000 rpm.

Data is also provided relative to somatic cell count using an iodine dipping solution for cleaning teats and wiping the teats dry with a towel. The somatic cell counts were taken at the same dairy at the beginning of every other month, which was and is the normal procedure for the dairy at which the experimental use of the inventive solution was used. As shown in the graph, the less concentrated solution of 75 ppm of chlorine dioxide produced somatic cell counts of about 200,000/ml to about 275,000/ml over about a two year period. When the experimentation of the inventive solution having 150 ppm of chlorine dioxide began, somatic cell count dropped below 150,000/ml thereby indicating the inventive disinfectant solution has a direct effect on pathogens that may cause mastitis.

System for Applying Solution

The aqueous chlorine dioxide disinfectant solution is generated by combining chlorite ($ClO_2^-$), in the form of a metal salt such as sodium chlorite, with an acidic activator. Accordingly in reference to FIG. 1, a disinfectant source 15 is provided and includes in a container 16 of sodium chlorite and a container 18 of the acid activator. In an embodiment of the invention, the acid activator in tank 18 is citric acid and preferably is a 50% citric acid solution that is combined with a 2% to 5% aqueous sodium chlorite solution in container 16, and preferably a 3% to 4% sodium chlorite solution, which contains about 32,000 ppm of sodium chlorite.

The tanks 16 and 18 are in fluid communication, via lines 30 and 32 respectively, with a chemical activation system 20. In addition, a water line 36 feeds water from a water source (not shown) to mix the sodium chlorite and acid activator (citric acid) with water. The activation system 20 referred herein operates generally on a venturi principal with the water flow from water line 36 generating suction to draw the sodium chlorite and the acid activator into the activation system 20 in mixing relationship with water. The sodium chlorite is mixed with the acid activator and water to generate an aqueous chlorine dioxide solution preferably having a concentration of about 6,400 ppm chlorine dioxide, which is further diluted at the diluting station 22, explained below in more detail.

An example of such an activation system is the Automated Activation Non-Electric (AANE) system that can be purchased from Bio-Cide International, Inc. located in Norman, Okla. The activation system 20 may operate using a float mechanism to control the volume of solution mixed. More specifically, when the volume of solution mixed in the activation system 20 drops to a predetermined level or volume, a valve control to the water line 36 is opened to initiate water flow so that sodium chlorite and acid activator is drawn into the activation system 20. Once the mixed solution reaches a predetermined volume, the float mechanism closes the appropriate water flow control valve.

The activation system 20 and dilution station 22 are in fluid communication via line 28 for delivery of the aqueous chlorine dioxide to the dilution station 22. As shown schematically in FIG. 2, the dilution station 22 includes a pump 42 that pumps the aqueous chlorine dioxide solution from the activation system 20 to the dilution station 22. In addition, water is directed to the dilution station 22 via water line 34 and mixed with the chlorine dioxide from the activation system 20. More specifically, the aqueous solution of chlorine dioxide and water are passed through a static mixer 28 to dilute the aqueous solution of chlorine dioxide to a predetermined concentration and produce a consistent flow of cleaning solution to the applicator applicators 26 in the milking parlor 24. The disinfectant solution is delivered to the applicator 26 via line 40.

Figure 3:
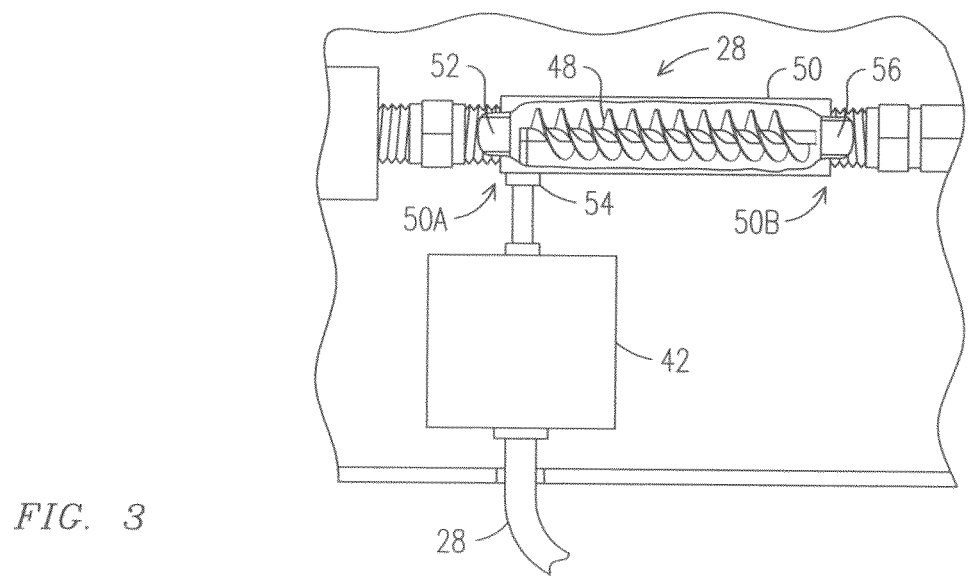
FIG. 3 is sectional view of a static mixer incorporated in the dilution station.

As shown in FIG. 3, the static mixer 28 includes a mixer element 48 that has a generally helical configuration and is positioned within a housing 50. While reference is made to the helical configuration other designs known to those skilled in the art may be used. The mixing element 48 may be composed of a chemically inert material, such as stainless steel or polypropylene, relative to the chemicals used to make the disinfectant. Mixing elements and/or static mixers can be purchased from Sulzer Ltd., which is headquartered in Switzerland. The housing 50 includes a water inlet port 52 and solution inlet port 54 disposed at a first end 50A of the housing. An outlet port 56 is disposed at the opposite or second end 50B of the housing 50 for the diluted aqueous chlorine dioxide, or disinfectant to exit the static mixer 28.

The helical configuration of the mixer element 48 allows for adequate mixing of the concentrated chlorine dioxide with water to provide a consistent flow of disinfectant to an applicator 26 in the parlor 24. Prior art systems not using a static mixer often suffer from disinfectant solution being provided to an applicator in pulses such that disinfectant was or is not consistently applied to teats, resulting in no disinfectant applied to some teats during a cleaning/disinfecting operation. The incorporation of the static mixer 28 solves these problems.

Figure 2:
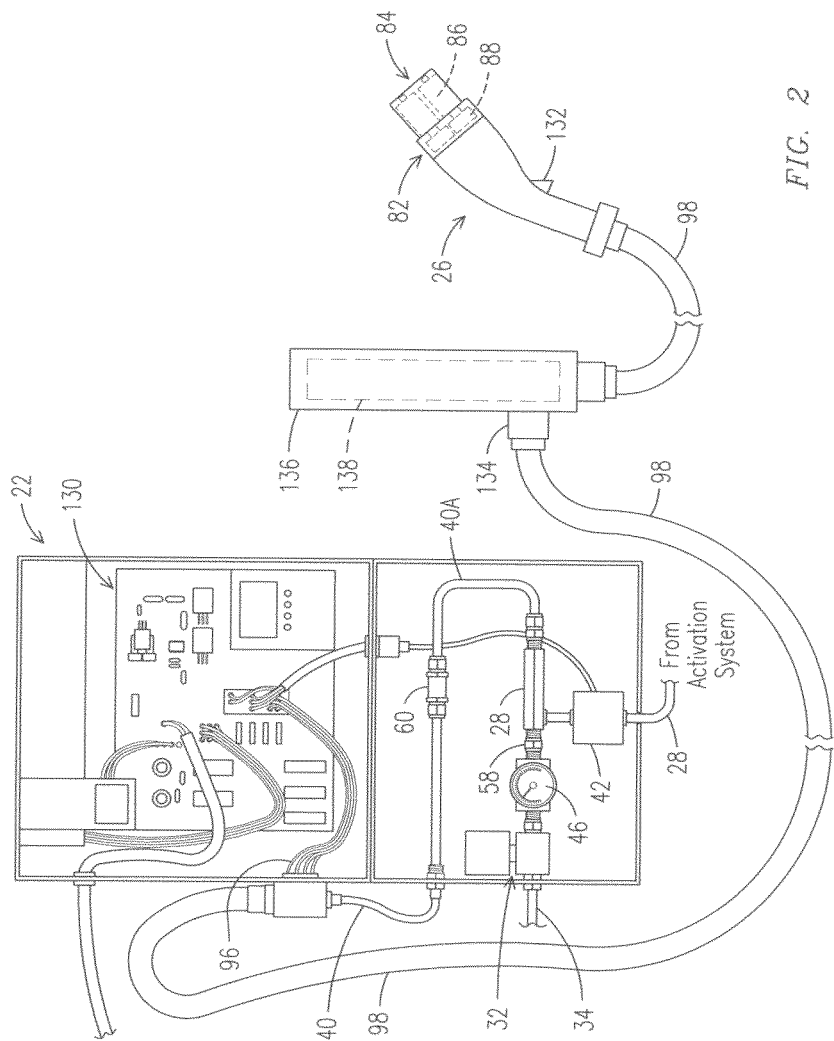
FIG. 2 is a schematic illustration of the dilution station with logic board, applicator and motor for driving an applicator.

An example of a pump that may be used to introduce the concentrated disinfectant into the static mixer 28 is a six cubic centimeter diaphragm pump that may pump about 0.6 ml per pulse. In addition, water via line 34 may be introduced at about 40 psi, which is about 1,450 ml/minute. The activation of the pump 42 and the flow of water via line 34 is generally controlled by a switch 132 on the applicator 26, and schematically shown in FIG. 2. More specifically, the applicator 26 includes a switch 60 that is electrically connected to the pump 42. In addition, and as shown in FIG. 2, a solenoid valve 32 may be positioned between the water line 34 and static mixer 28 that is opened when the switch 132 is actuated. When an operator of the system 10 actuates the switch 132 on the applicator 26, the pump 42 delivers the concentrated chlorine dioxide to the static mixer 28 at the dilution station 22. In addition, the solenoid valve 32 is opened so that water is also delivered to the static mixer 28 to mix the water with the concentrated chlorine dioxide.

A fluid flow regulator 46 is preferably disposed between the solenoid valve 32 and the static mixer 28 to control a water flow rate into the static mixer 28 so that the chlorine dioxide solution is diluted to a predetermined concentration described above for delivery to the applicator applicators 26. For example, water may be introduced via line 34 at 40 psi, which is approximately 1.45 liters/minute.

Again in reference to FIG. 2, the dilution station 22 may include one or more check valves to control flow of the disinfectant solution. As shown, a first check valve 58 may be disposed between the solenoid valve 32 and the static mixer 28 to prevent backflow of the disinfectant into the water line 34. In addition, a second check valve 60 may be disposed between the outlet port 54 of the static mixer 28 and the applicator 26, and preferably adjacent to the static mixer 28, to prevent the flow of the disinfectant solution to the applicator 26 when the system 10 is not in use. Accordingly, the check valve 60 may be set to open only when the fluid pressure in the line 40A exceeds a predetermined pressure which is indicative of the disinfectant solution being delivered to the applicator 26 while in use.

Hand-Held Applicator

Figure 4:
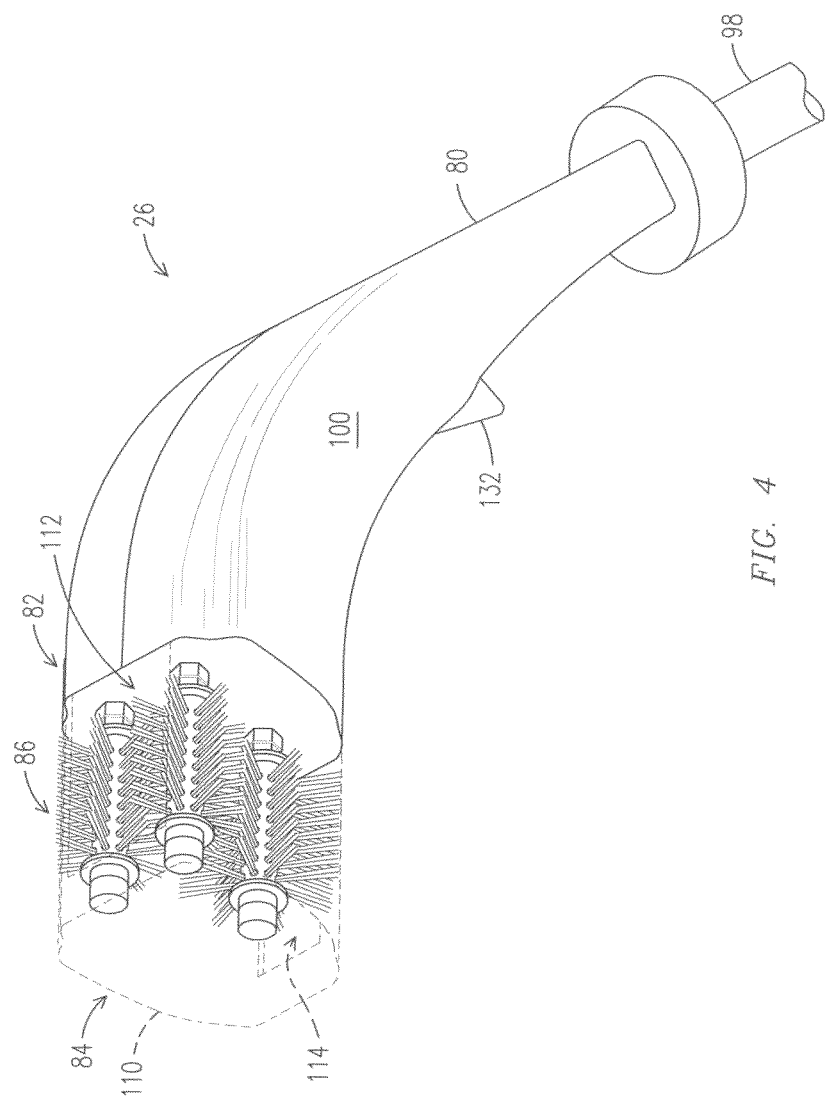
FIG. 4 is a perspective view of a hand-held applicator.
Figure 5:
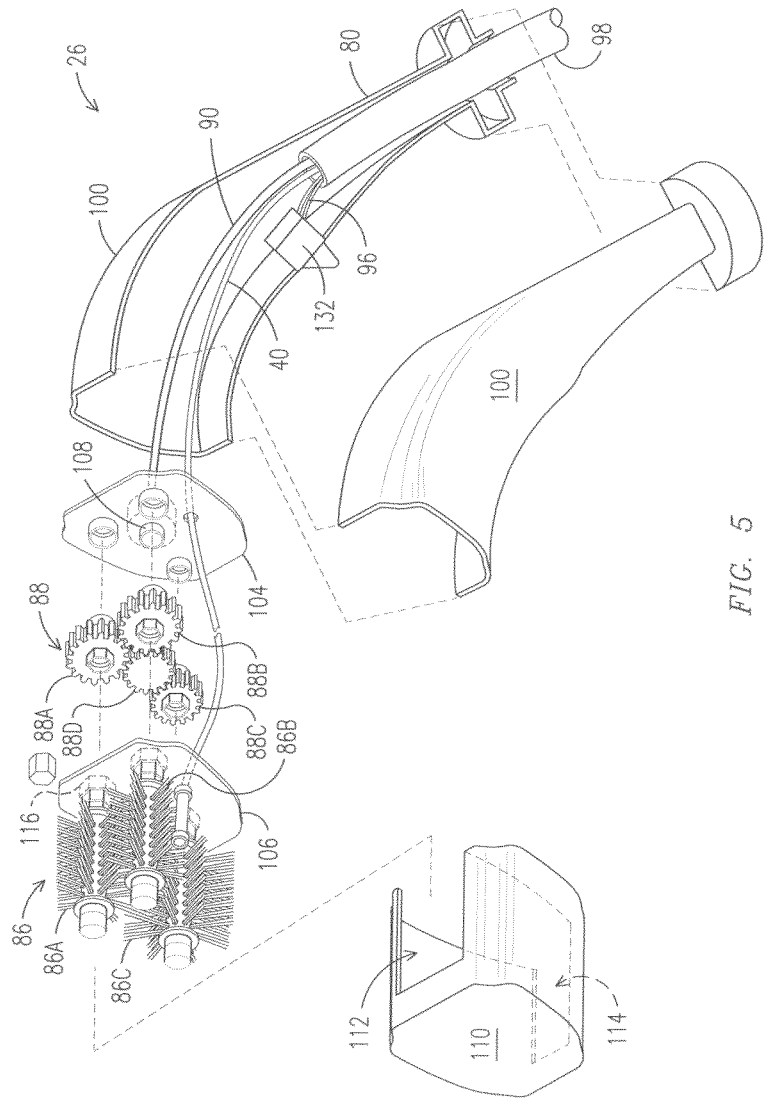
FIG. 5 is an exploded perspective view of the applicator of FIG. 4.

A disinfectant solution applicator 26 that may be used in embodiments of the invention is schematically shown in FIGS. 2, 4 and 5. One or more applicators 26 are positioned within the milking parlor 24 to clean and disinfect teats of a plurality of milk-producing animals such as cows that have been herded into the parlor 24 for milking. The applicator 26 includes a plurality of rotating brushes 86 that are operatively connected with a gear system including a plurality of gears 88 that are actuated by a drive shaft 90, which in turn is driven by a motor 138.

In an embodiment, at least one applicator 26 is provided in fluid and electrical communication with the above-described dilution station 22 from which the aqueous disinfectant is delivered. The applicator 26 is remotely positioned and operable relative to the dilution station 22, power source (not shown) and logic control board 130, so that an operator may hold and use the applicator 26 at various locations throughout the parlor 24. Accordingly, the system 10 and applicator 26 can be used with milking parlors of varying designs such as parallel, herringbone and rotating parlors.

Again with respect to FIG. 2, the applicator 26 is connected in fluid communication to the dilution station 22 by a flexible conduit/line 40 and in electrical communication by electrical lines 96 contained within a flexible and insulated jacket 98. The conduit/line 40 is preferably composed of neoprene or santoprene, having an inside diameter of about 0.17 inches. As shown in FIG. 2, the electrical lines 96 are connected to a logic board 130 that is programmed to control the activation of pump 42 and solenoid valve 32 for diluting the concentrated disinfectant at the diluting station 22 and delivery of the diluted disinfectant to the applicator 26. In addition, the logic board 130 is programmed to command the rotation of the brushes 86 coincident with delivery of the diluted disinfectant to the applicator.

In a preferred embodiment, the logic board 130 is programmed such that when the switch 132 is depressed or actuated the disinfectant is delivered from the dilution station 22 to a volume within applicator 26 occupied by the brushes 86. As long as the switch 132 is actuated, the disinfectant is delivered to the applicator 26 and the brushes 86, which are rotating. The logic board 130 is preferably programmed so that when the switch 132 is released, the solenoid valve 32 is closed and pump 42 is deactivated. However, the logic board 130 may be programmed with a delay so that brushes 86 continue to rotate for a predetermined time duration after the delivery of the disinfectant has been discontinued. In an embodiment, the time delay may be about 4 to about 7 seconds so that the rotating brushes 86 may be used to partially dry teats after the application of the disinfectant.

With respect to FIGS. 4 and 5, the components of the applicator 26 are illustrated in more detail. As shown, the applicator 26 includes a handle 80, a gear housing 82 and a brush housing 84. A shell casing 100 is configured at one end to form the handle 80 that houses the insulated jacket 98 with the flexible conduit/line 40 and electric lines 96, and a flexible drive shaft 90. As shown schematically in FIG. 2, the jacket 98 encasing the conduit 40 and electrical lines 96 are connected to an adapter 134 that is mounted to a housing 136 for a motor 138 that actuates the flexible drive shaft 90. The motor 138 may be a 24 volt DC brushless asynchronous motor that is in electrical communication with the logic board 130 via one of the electrical lines 96. The motor 138 is preferably driven at about 900 rpm so the brushes 86 rotated at preferably 500 rpm.

The flexible conduit 40, remaining electrical lines 96 and the drive shaft 90 extend through a flexible jacket 98 to the applicator 26. More specifically, these components are also housed in the handle 80 of the applicator 26, with the drive shaft terminating at the below-referenced gear housing 82 and the electrical lines 96 connected switch 132 and ground.

The shell casing 100 also forms in part the gear housing 82, which houses the gears 88 beginning at a point where the drive shaft 90 terminates. The drive shaft 90 extends through a first mounting plate 104 and is operatively connected to a central gear 88D, and is secured to the first mounting plate 104 with an adaptor 108. A second mounting plate 106 is secured in space relation to the first plate 104, wherein the shell casing 100, first mounting plate 104 and second mounting plate 106 define the gear housing 82.

In a preferred embodiment, the applicator 26 includes three brushes 86A, 86B and 86C wherein each such brush is operatively connected to a corresponding gear 88A, 88B and 88C. In addition, a central gear 88D is operatively connected to the drive shaft 90 as described above and each of the gears 88A, 88B and 88C to rotate the brushes 86A, 86B and 86C. A cover 110 is mounted to the second plate 106 forming the brush housing 84. The cover 110 includes a first opening 112 through which a teat of an animal is inserted for cleaning, and a second opening 114 that allows debris and fluid to escape from the brush housing 84 during a cleaning operation.

Figure 6:
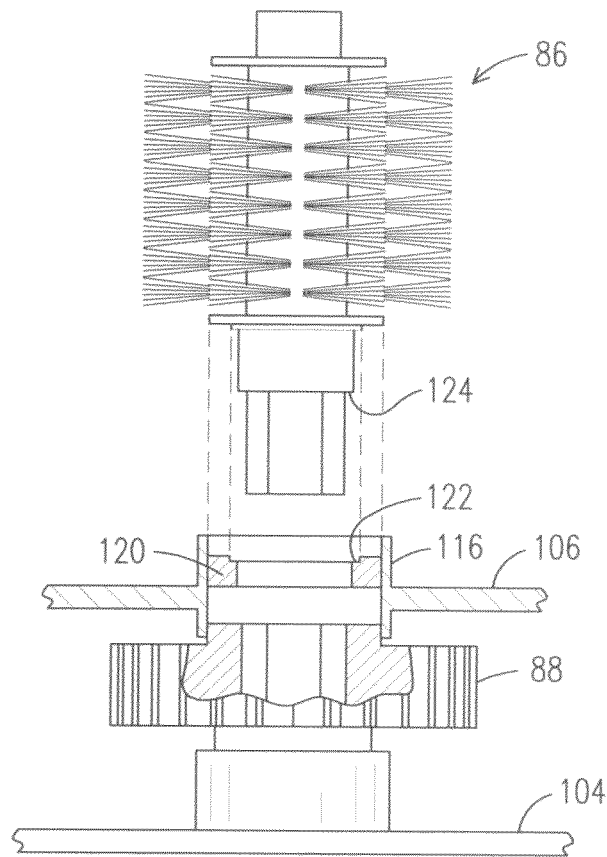
FIG. 6 is a sectional view of a brush and gear housing showing the brush/bearing interface and the brush/seal/gear interface.

With respect to FIG. 6 the interface of the gears 88 with the brushes 86 is represented by reference to a single brush 86 and gear 88, the second plate 106 includes hubs 116 through which a base 118 of a brush 86 is inserted for engagement with a corresponding gear 88. A bushing 120 is disposed within each hub 116 and includes a lip 122. In addition, the base 118 of each brush 86 includes a step 124 that fits in mating relationship with lip 122 on bushing 120. In this manner, the gear housing 82 and brush housing 84 are sealed from one another so that debris cleaned from teat is purged from the brush housing 84 and does not enter the gear housing 82 thereby fouling the components, namely the gears 88, in the gear housing 82 and bushing 120.

The gears 88A-88D and the bushings 120 are preferably composed of Hydex® 4101L, which is a polybutylene terephthalate plastic that has a relatively low coefficient of friction, and does not require lubricating materials. Prior art teat scrubbers typically use components that required lubricating materials. If debris enters the gear housing, the lubricating material captured the debris forming an abrasive amalgam that fouls the gear components.

Figure 8A:
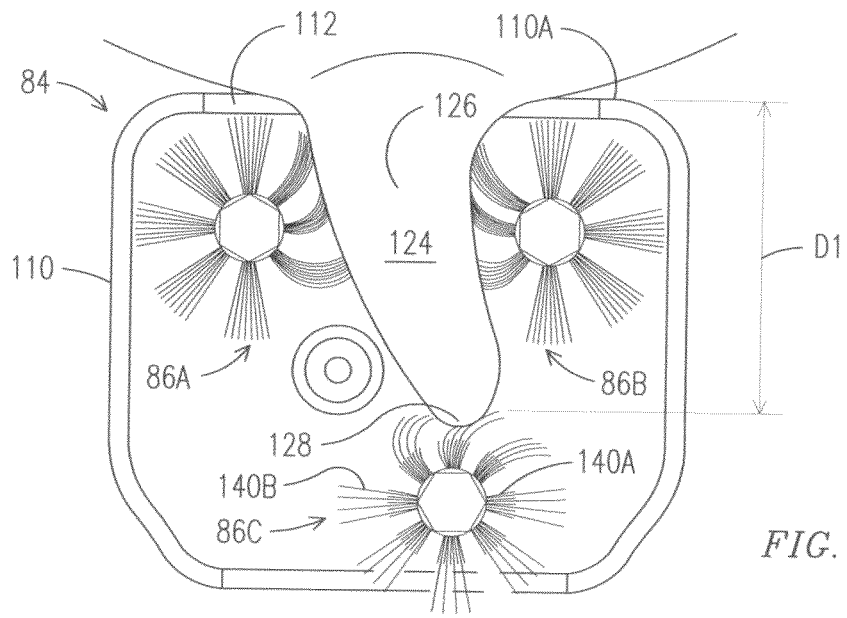
FIG. 8A is a schematic illustration of brushes in applicator including teat end brush for cleaning a shorter length teat.

With respect to FIG. 8A the arrangement of the brushes 86A, 86B and 86C are shown in more detail. As illustrated, a preferred embodiment includes two base brushes 86A and 86B that positioned side-by-side and adjacent to the first opening 112 of the cover 110. The brush 86C may also be referred to as a tip brush that is positioned relative to the other base brushes 86A and 86B, and relative to a teat of an animal to clean the tip of the teat. In an embodiment, the bristles on the brushes 86 are preferably nylon filaments having a diameter of 0.12 mm. The brushes 86 are preferably rotated at rotational speeds of about 400 rpm to about 700 rpm, and ideally rotated at a speed of about 500 rpm. Prior art applicators that include brushes utilize polypropylene filaments having diameter of 0.10 mm which provide a more coarse touch to a teat than bristles composed of nylon filaments. In addition, the prior art systems having polypropylene filament bristles are rotated at speeds of about 900 to about 1,000 rpm, which may adversely affect animal comfort during cleaning, which can affect the amount of milk produced during milking.

Figure 11:
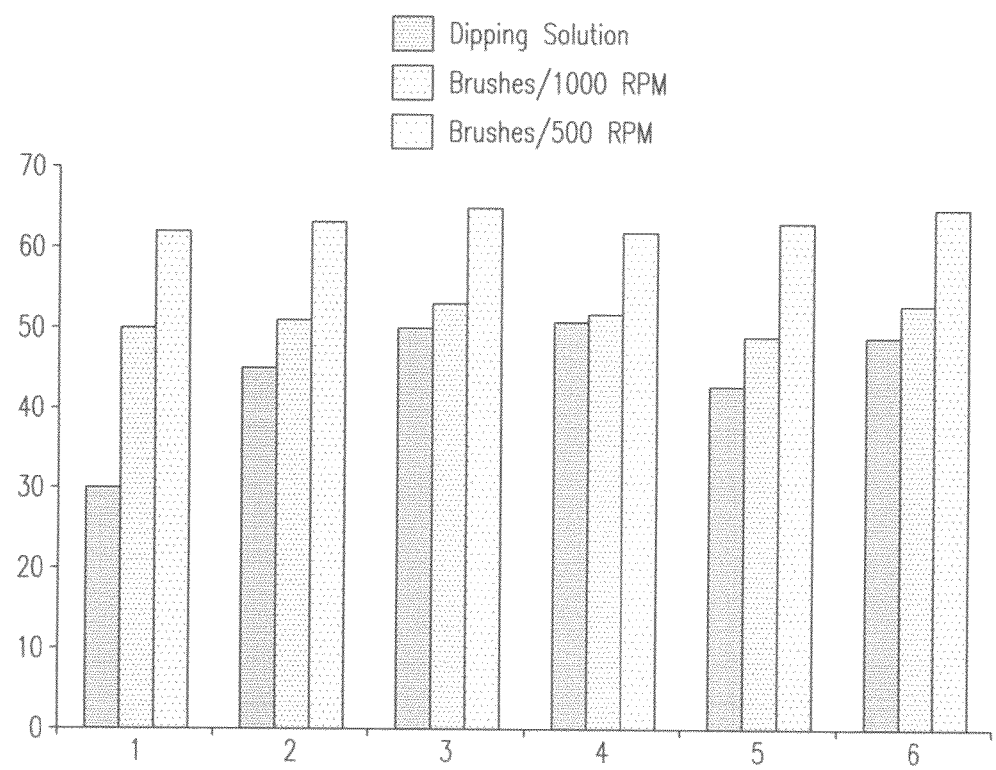
FIG. 11 is a bar graph comparing brushes with nylon bristles rotated at about 500 rpm compared to a dip cleaning operation and a cleaning operation with brushes having polypropylene bristles rotated at about 1,000 rpm.

With respect to FIG. 11 a bar graph illustrates the percentage of milk produced during the first two minutes of a milking using an iodine dipping solution and towel wiping for drying, a teat scrubbing unit with brushes rotating at 1,000 rpm and a teat scrubbing unit using brushes rotated at 500 rpm. The brushes rotated at 1,000 rpm were the prior art brushes including the polypropylene filament bristles. The brushes rotated at 500 rpm included the above-described nylon filament bristles. A disinfectant solution with a concentration of about 150 ppm aqueous chlorine dioxide (with moisturizing additives) and a 75 ppm aqueous chlorine solution (without additives) was used with the scrubbing unit having brushes rotated at 1,000 rpm. A 75 ppm aqueous chlorine dioxide solution (without additives) was used with the scrubbing unit having brushes rotated at 1,000 rpm. The data was taken from six different dairies each using the three different teat-cleaning techniques.

As shown, the brushes having the nylon filament bristles rotated at about 500 rpm produced more milk during the first two minutes of a milking operation. More specifically, the system produced on average about 63.33% of the total milk produced in a milking operation during the first two minutes of THE milking operation. An average of 51.33% of the total milk produced during a milking operation was produced during the first two minutes of a milking operation using the polypropylene filament brushes rotated about 1,000 rpm. An average of 44.67% of the total milk produced during a milking operation was produced during the first two minutes of a milking operation using the iodine dip and wiping the teats dry.

Average milking operations are about 4½ to 6 minutes with all teats being milked simultaneously; and, some dairies may have milking operation of less than 4 minutes. By producing more milk during the first two minutes of a milking operation, the total time of the milking operation can be reduced. In addition, cows that produce more milk during that first two minutes of a milking operation are more likely to "milk-out" completely, which is known to reduce the chances of mastitis. Moreover, more milk produced in the first two minutes of a milking operation is an indicator that the cleaning process is providing good quality stimulation to the teats.

In an embodiment, all of the brushes 86A, 86B and 86C have the same diameter. For example, the brushes 86A, 86B and 86C may have a diameter measured from an end of a bristle to the end of a diametrically opposed bristle of about 1.625 inches for cleaning the teats of a cow; however, the brush diameter may vary according to the size of diameter and/length of the teat 126 inserted for cleaning and positioning of the brushes relative to one another.

Figure 7:
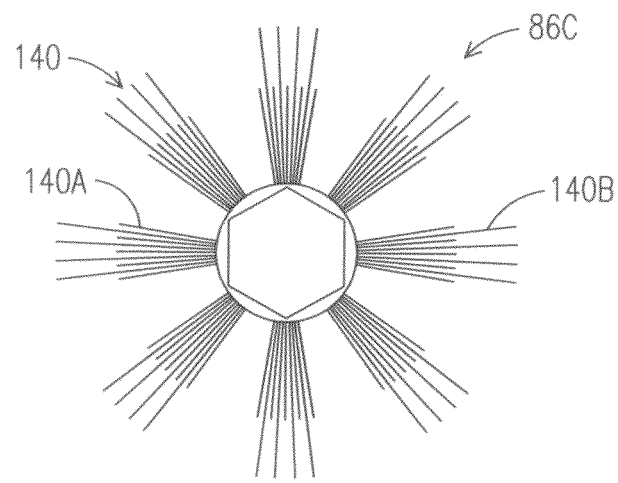
FIG. 7 is an end view of a teat end brush having filament bristles of multiple lengths.
Figure 8B:
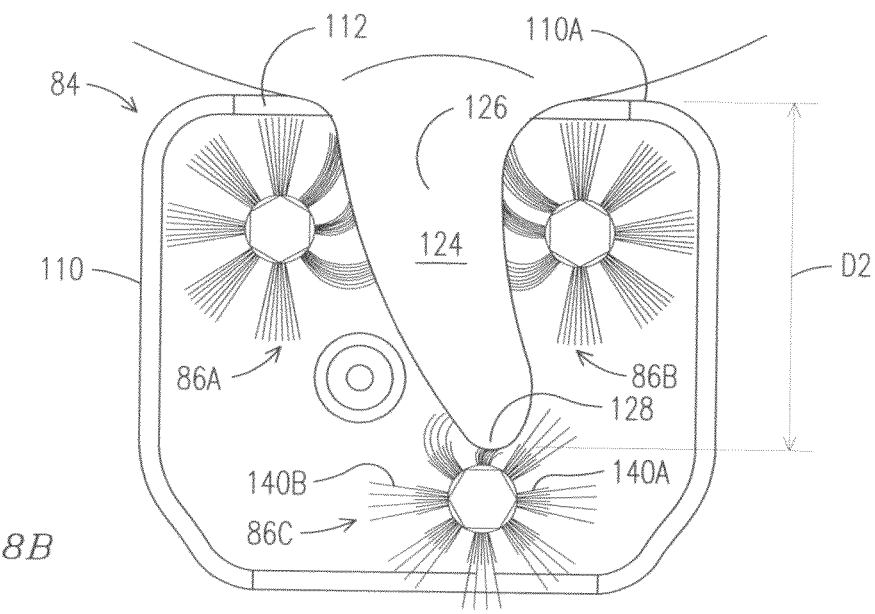
FIG. 8B is a schematic illustration of brushes in applicator including teat end brush for cleaning a longer length teat.

In reference to FIGS. 7, 8A and 8B, there is schematically illustrated another embodiment of the invention with the teat end brush 86C including bristles having multiple lengths, and the positioning of the teat end brush 86C relative to the barrel brushes 86A and 86B and a teat 124. Providing bristles of multiple lengths, the system 10 and the applicator may account for teats of varying lengths. By way of example, American bred cows have a teat length that is about 1.8 inches to about 1.9 inches, while teats of foreign bred cows may be longer.

In reference to FIG. 7, the teat end brush 86C includes bristles 140 for cleaning a teat, wherein the bristles 140 include a first of set of bristles 140A and a second set of bristles 140B. The first set of bristles 140A has a length that is shorter than the length of the second set of bristles 140B. As shown in FIG. 8A, a teat 124 is inserted into the brush housing 84 of the applicator 26 and between the barrel brushed 86A and 86B. The rotating barrel brushes 86A and 86B contact the teat base 126 and the teat end brush 86C engage the teat tip 128. More specifically, FIG. 8A shows the second set of (longer) bristles 140B engaging the tip 128 of a teat 124 having a shorter length; and in FIG. 8B, a teat tip 128 of a teat 124 having a longer length is engaged by the first set of bristles 140A having a shorter length relative to the second set of bristles 140B.

In order to accommodate different teat lengths, the tip brush 86 C is positioned in the brush housing 84 so that distance from an outside surface 110A of the cover 110 adjacent the opening 112 to the free ends of the bristles 140A and 140B varies. By way of example, the distance D1 shown in FIG. 8A from surface 110A to the free end of bristles 140B may be about 1.8 inches for shorter length teats; and, the distance D2 shown in FIG. 8B, from surface 110A to the free end of the bristles 140B may be about 2.2 inches for longer teat lengths. While bristles 140A and 140B are shown brushing against the teat 124, the distances D1 and D2 shown in FIGS. 8A and 8B respectively, are determined from the surface 110A to a free end of the bristles 140 when the bristles 140 are in a static position and not operational.

Method of Applying Disinfectant Solution

Figure 9:
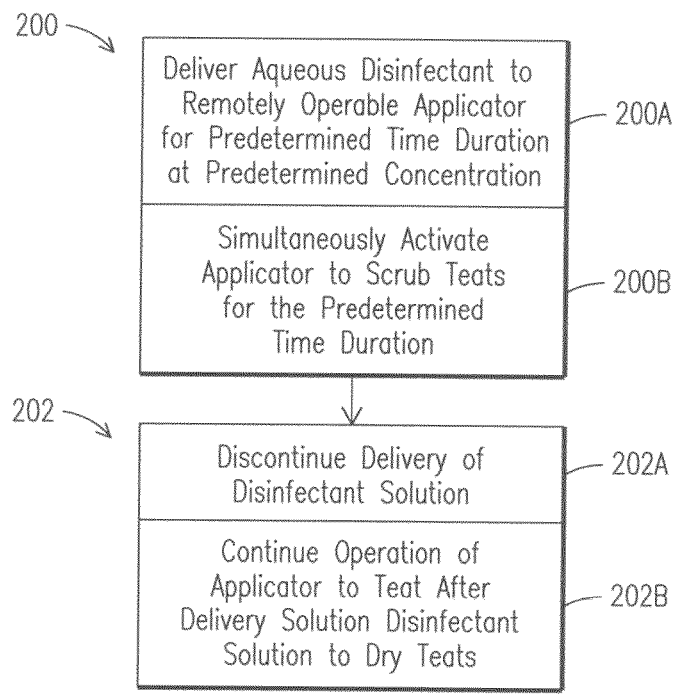
FIG. 9 is a flow chart including steps in a method or process for cleaning the teats of a milk-producing animal.

Steps in application of a disinfectant solution are set forth in flowchart shown in FIG. 9. In step 200, two operations take place including step 200A in which delivery of the aqueous disinfectant solution to the applicator takes place for a predetermined time duration. In step 200B the applicator is simultaneously activated to scrub the teats for the predetermined time duration while the disinfectant solution is delivered. As described above, the actuation of the switch 132 initiates command or electrical signals that result in the solenoid valve 32 opening and activation of pump 42, so water (via line 34)

and concentrated disinfectant solution (via line 28 from activation system 20) respectively flows through mixer 28 and to the applicator 26.

Actuation of the switch 132 also transmits signals causing the brushes 86 to rotate so a teat 124 is scrubbed as the disinfectant solution is delivered to the brush housing 84. Milk producing animals, such as cows, have four teats. The cleaning operation preferably takes place from the rear or side of the cow, and begins with the teat are furthest away and moves in a clockwise or counter-clockwise direction. The solution is delivered to the rotating brushes 86 as long as the switch 132 is actuated. The solution may be delivered for a first time duration of about 5 to 8 seconds when the brushes are rotating. The applicator 26 is preferably reciprocated in an up-down and twisting motion during application of the solution to adequately clean the teat.

As previously indicated the solution is an aqueous chlorine dioxide solution having a concentration of about 150 ppm and delivered to the brushes 86 at a flow rate of about 40 psi, or about 1.45 L/min. The brushes 86 are preferably composed of nylon bristles and rotate at a speed of about 500 rpm to about 520 rpm.

After all teats have been scrubbed and are free of visible soil, the switch 132 is released which discontinues or stops the delivery of the disinfectant solution to the applicator 26, which is set forth in step 202A. However, the logic control 130 is programmed with a time delay so the brushes 86 continue to rotate for a second predetermined time duration as the brushes 86 remain in contact with the teat, as described in step 202B. The brushes 86 may continue to rotate for a sufficient time, i.e. 4 to 7 seconds to dry the teats. This second time duration is preferably of a length so that the teat is not entirely dried of the solution and some solution residue may remain on the teat to further disinfect the teat. After a teat has been cleaned and dried the applicator 26 is moved to the next teat. By beginning with teats that are positioned farthest away and moving in a clockwise or counterclockwise direction, cross contamination may be avoided. The disinfectant solution is then in contact with skin on the teat for 60 to 120 seconds, because the solution does not contain any conditioning compounds the solution sublimes prior to attachment of a milking machine.

System and Method for Monitoring Teat Cleaning Procedures

In a preferred embodiment the logic board (controller) 130 is programmed or configured to monitor certain parameters associated teat cleaning procedures by monitoring the amount of time the system is under a "wash mode" and/or "dry mode" and/or the number of teats inserted into the applicator 26 in the wash mode and/or dry mode. That is, dairy farms incorporate milking schedules during a work day. Such schedules may include multiple milking operations during a single day, in which cows are led into the milking parlor, prepped for milking and then milked. For each work day and for each milking operation, the schedule typically includes a desired number of cows to be milked per milking operation or per day.

Control systems are available to extract data relative to certain milking operation parameters such as milking time or how long a milker is on a cow teat, how long a cow may stay in a holding area before loading the cow, the time related it takes to load cows into a parlor, etc. Based on this data, a dairy farm may identify certain inefficiencies associated with a milking operation in order to increase the number of cows that may be milked during a milking operation.

However, to date, the inventors are not aware of a system or method that enables a dairy farm to electronically extract data relative to teat cleaning procedures to analyze such data so dairy farm operators may improve the efficiency of milking operations. To that end, the above described system 10 may be adapted to acquire and/or generate data during the teat cleaning phase of a milking operation to evaluate a number of different steps or parameters associated with a teat cleaning procedure. For example, data relative to the amount of time that the applicator 26 is activated to clean and dry the teats of one or more cows, the amount of time the disinfectant solution is applied to a teat and/or the amount of time the applicator 26 may be used to dry the teats after application of the disinfectant solution.

In addition, or alternatively, the system 10 may be adapted to monitor the number of teats that are inserted into the housing volume of the applicator 26 during the wash mode and dry mode. In as much as a cow typically has at least three milk producing teats, the system 10 may be adapted to count the number of teats for each cow that are cleaned and then dried to determine the number of cows that have been properly prepped for milking or determine the number of cows that have been properly prepped according to a dairy farm's cleaning procedures.

While the invention may be described in terms of monitoring these described teat cleaning parameters, the invention is not so limited and is intended to encompass monitoring any step or parameter associated with teat cleaning. In addition, when referring to the logic board or controller 130, one skilled in the art will appreciate that the logic board 130 or another separate controller may be configured to monitor certain parameters and/or generate data associated with operating parameters of a teat cleaning phase of a milking operation.

Accordingly, the system 10 may monitor a teat cleaning procedure by monitoring and/or detecting electrical signals associated with the operation of the applicator 26 during cleaning and drying teats. This may be done by monitoring the current supplied to the motor 138 when the switch 132 is actuated so that the disinfectant solution is applied to the cow teats as the brushes 86 are rotated. As described above, the disinfectant solution may be delivered to applicator 26 for a first time duration of about 5 to 8 seconds. This time duration may be characterized as the "wash mode." An operator, during the wash mode, cleans the teats as described above. Once the operator finishes scrubbing all the teats, the switch 132 is released; however, the logic board 130 is configured to control the motor 138 so the brushes 86 continue to rotate for a second time duration (i.e., 4 to 7 seconds) after the switch 132 is released. This second time duration may be called the "dry mode", during which the washed teats are inserted into a housing volume of the applicator for drying.

In an embodiment, the logic board 130 may be programmed to control the motor 138 so that the brushes 86 are always rotated at a predetermined frequency, for example, 500 rpm. When the switch 132 is actuated a current is supplied to the motor 138 to rotate the brushes at the predetermined frequency or rate. Once a teat is inserted into the applicator 26, the current is adjusted or increased so the rate or frequency of rotation of the brushes is maintained at the predetermined level. That is, the motor 138 pulls additional current to account for the "load" created by the teat. Accordingly, the amount of time the motor 138 or brushes 86 are under "load" or the amount of time a teat is inserted in the applicator 26 may be monitored by monitoring the amount of time the current has been increased to account for the insertion of the teat in the applicator. In addition, by monitoring the increase and decrease of the current above a current threshold, the controller 130 is able to monitor the number of teats that are inserted into and removed during the wash and dry modes.

As explained in more detail below, each time during a wash mode, the current supplied to the motor 138 exceeds a current threshold or each time the current is adjusted so that the brushes 186 rotate at a desired frequency (rpm) is an indication that a teat has been inserted into the housing volume of the application during the wash mode (i.e., after the switch has been depressed). To that end, when the teat is removed from the applicator 26, the current supplied to the motor 138 drops below the current threshold. Thus the controller 130 is configured to count each time during the wash mode a teat is inserted into and then removed from the housing volume indicating a teat has been washed.

After all teats, or a predetermined number of teats, such as three teats have been washed, the switch 132 is released to operate the applicator 26 in the dry mode. More specifically, once the switch 132 is released, the brushes 86 continue to rotate during a dry mode as previously described. When a teat is inserted into the housing volume of the applicator 26 the controller 130 adjusts the current supplied to the motor, above the current threshold, to account for the "load" on the brushes 86 and/or motor 138 indicating a teat has been inserted in the applicator 26. When the teat is removed, the current will then drop below the current threshold. Thus, the controller 130 is configured to count each time the current exceeds and drops below the current threshold during a dry mode of a cleaning operation to count the number of teats that have been dried.

In addition, the logic board 130 or another controller may be programmed to monitor a parameter that indicates the amount of time that the disinfectant solution is supplied to the applicator. As previously described, when the switch 132 is actuated to rotate the brushes 86, the logic board 130 generates an electrical signal, or a signal is otherwise generated to open the solenoid valve 32 and activate the pump. Therefore, the amount of time the switch 132 is depressed is an indicator of the amount of time the disinfectant solution is applied to a teat, or the amount of time the applicator 26 is operating in a wash mode. Accordingly, the controller 130 may monitor the amount of time from when the pump 42 is activated and/or the valve 32 is open, or when the switch 132 is depressed and the time when the switch is released, thereby closing the valve 32 and deactivating the pump 42. One skilled in the art will appreciate that other signals or operating conditions may be monitored as an indicator of the amount of time applicator is in a wash mode. By monitoring the amount of time the system 10 is operated in the wash mode during a milking operation shift, one can determine the amount disinfectant solution that is consumed during respective milking operations, and potentially identify where or when the disinfectant solution 45 may be over or under consumed.

The controller 130 may also be configured to determine the amount of time the applicator 26 is run in the dry mode. That is, given that the total amount of time the motor 138 is activated to rotate the brushes 86 is known, and the amount of time the disinfectant solution is supplied to the applicator is known, the controller can determine the amount of time the applicator 26 is operated in the dry mode. Alternatively, or in addition, the controller 130 may be programmed to distinguish or identify that the dry mode is initiated when the switch 132 is released and monitor the time the brushes 86 continue to rotate without disinfectant solution supplied and with a teat inserted in the applicator 26.

Figure 12:
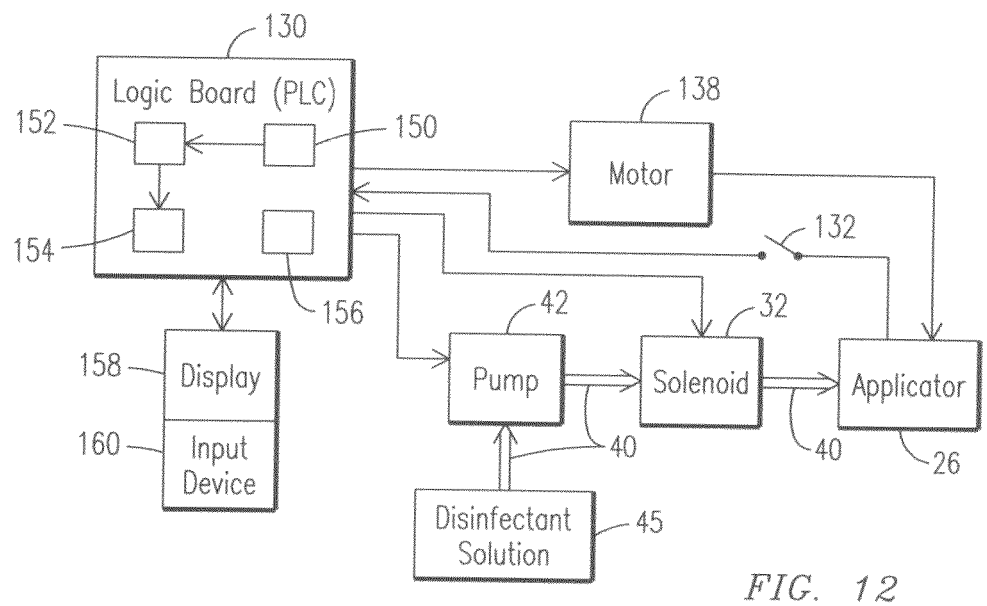
FIG. 12 is a schematic illustration of a programmable system for monitoring teat cleaning procedures.

A schematic illustration of the system 10, including components for monitoring teat cleaning procedures, is shown in FIG. 12 and includes the previously described components for a system for cleaning teats. As shown the controller/PLC 130 may include a sensor 150, or the sensor 150 is provided in electrical communication with the controller 130 to monitor the current supplied to the motor 138. The sensor 150 may be a current transducer such as the MCR-S-DCI current transducer supplied by Phoenix Contacts, of Blomberg, Germany; however the invention is not so limited and other devices known to those skilled in the art may be used to monitor the current supplied to the motor 138.

Data indicative of the current supplied to the motor 138 is transmitted to a counter 152 that is configured to count the number of teats that are cleaned, or inserted into applicator 26 housing volume during both the wash mode and dry mode. More specifically, and as described above, when a load (teat inserted in the applicator) is placed on the brushes 86 and motor 138, the rotational velocity or frequency of the motor shaft and brushes 86, the motor 138 will draw additional or compensating current in order to maintain a set or desired voltage output. The counter 152 is preferably configured or programmed to count a teat on a cow having been washed or dried when the current supplied exceeds (teat inserted in applicator 26) the current threshold then subsequently drops below (teat removed from applicator 26) the current threshold.

Figure 13:
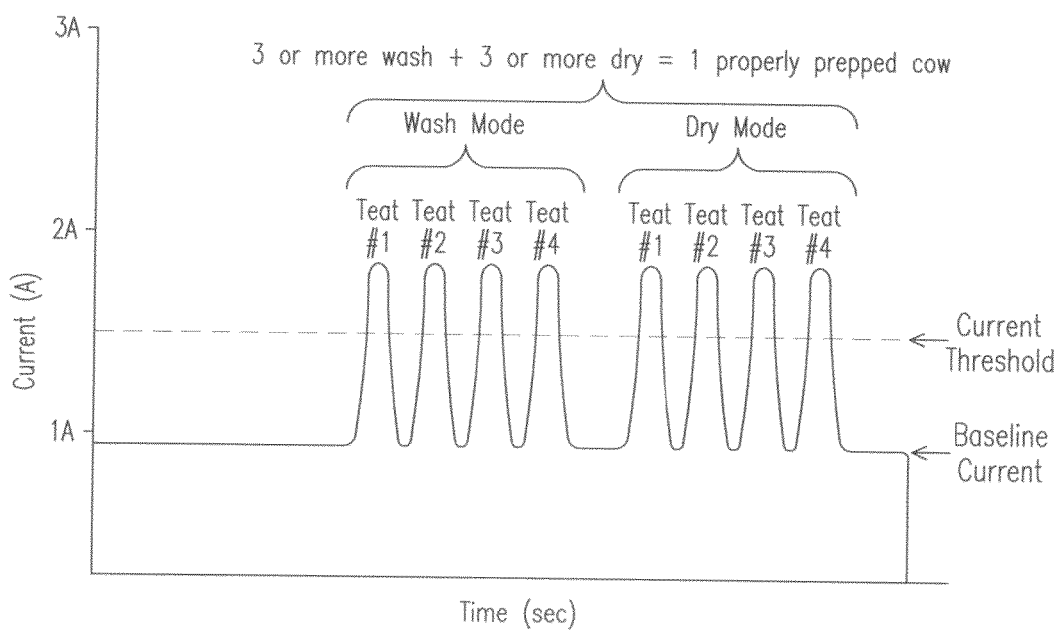
FIG. 13 is a graph showing the detection and count of teats during a wash mode and dry mode of a teat cleaning procedure.

In reference to FIG. 13, a graph is provided to illustrate a cow having been properly prepped for a milking operation and counted by the controller 130. As shown the Current (A) to the motor 138 is plotted versus Time (seconds) during which teats 1-4 are cleaned in a wash mode and dried in a dry mode. However, the number of teats counted in each mode is not necessarily a function of time as much as it is a function of the number of times or increments at which the current exceeds the current threshold and then drops below the current threshold, representing a teat having been inserted and then removed from the applicator.

As shown in FIG. 13, the graph includes a Baseline Current which represents the current supplied to the motor 138 when a load is not applied (teat not inserted) to the brushes 86 and motor 138. For the above described system 10, when the motor 138 is running without a load the Baseline Current may be about 1 amp; however, it could be more or less depending on the size of the motor or type of motor used or other variables. The Current Threshold may be predetermined or set and as shown in FIG. 13, the current threshold is set at about 1.4 to 1.5 amps.

Alternatively, the controller 130 may be programmed to determine a Current Threshold as a percentage increase above the Baseline Current. That is, overtime as the system 10 is operated the Baseline Current may change as a result of, for example, gear or other component wear. Accordingly, the controller 130 may be programmed to calibrate the Baseline Current, and the current threshold is determined as a percentage increase over the calibrated Baseline Current. For example, when the system 10 is turned on at an input mechanism 160 (FIG. 12), which may simply be a button or a key on a key pad or touch screen, the motor 130 is activated for a predetermined time (e.g. 3 seconds) and the current detected over that time period is averaged to determine the Baseline Current, and the current threshold is then determined as a percentage increase of the Baseline Current. For example, if the calibrated Baseline Current is determined to be 1 amp, then the current threshold may be 1.4 amps.

Figure 14A:
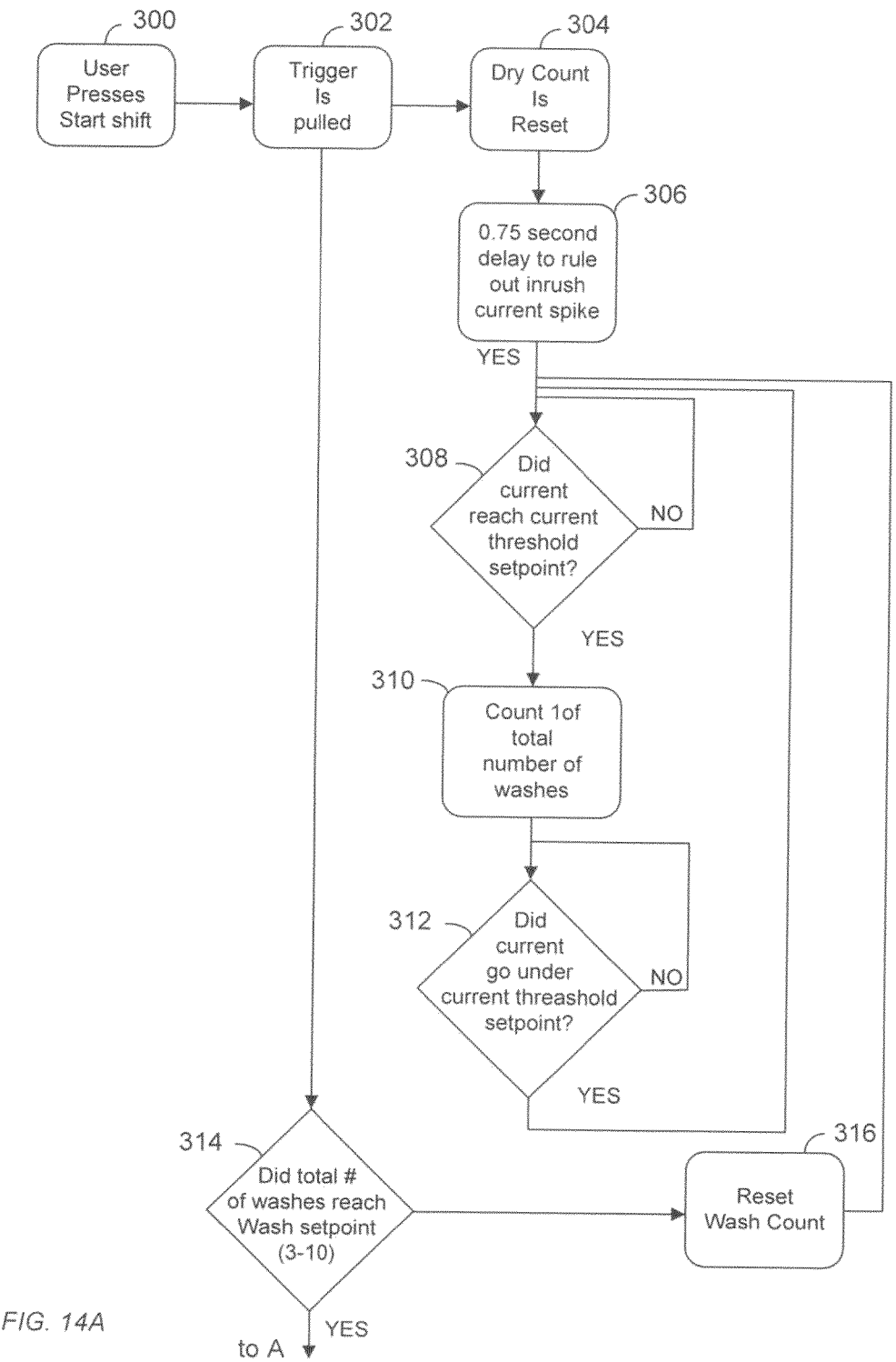
FIGS. 14A and 14B include a logic flowchart or steps in a method for cleaning teats.
Figure 14B:
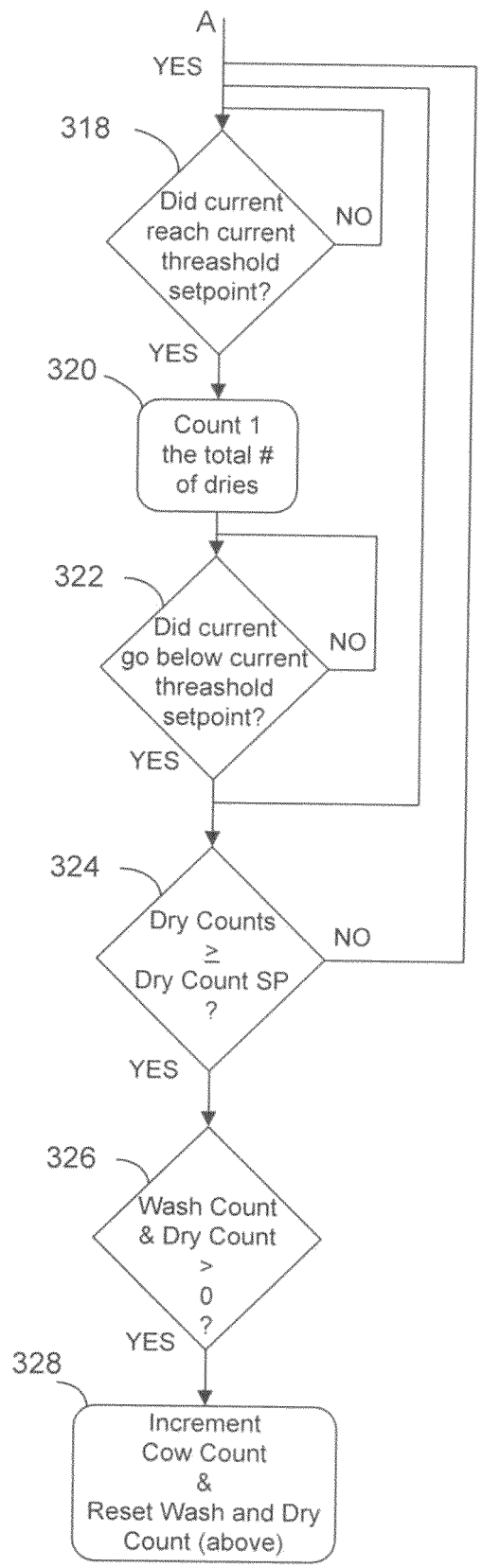

With respect to FIGS. 14A and 14B, a flowchart is shown representing a programming logic, or steps in a method, followed in a teat cleaning procedure as monitored by the system 10 or controller 130. At block 300 a shift for a milking operation, including teat cleaning operations, is started by activating the controller 130 via the input device 160. This may simply be a button to start the controller 130, or a key on a keypad or touch screen including a display screen 158. The system 10 may be equipped with an input mechanism 160 that an operator uses to enter an administrative code and user identification code to start the system 10 at the beginning of the milking operation. The user identification code is unique to each operator that may use the system 10 for a milking operation. This user identification code may be particularly useful when a dairy farm employs multiple operators to perform the milking operations. Thus the data generated relative to the teat cleaning procedure may be associated with a particular operator, which information may be useful for narrowing efficiencies or inefficiencies to the particular operator.

At block 302 a query is made whether the switch 132 has been depressed or pulled. If the answer is YES, any previous count of teats made in a dry mode is reset at block 304, and at block 306 the controller delays monitoring of the current to the motor for a time period (e.g. 0.75 seconds) to avoid detecting or rule out a rush in current spike, which may be a false indication of a teat being inserted into the applicator.

After this time delay the controller 130 starts to monitor the current supplied to motor 138. In as much as the trigger has been pulled the system 10 is operating in a wash mode, wherein disinfectant solution is supplied to the housing volume for cleaning teats. At block 308 a query is made as to whether the current reaches or exceeds the Current Threshold, and, if the answer is NO, the query is made again. The query routine is repeated until a teat is inserted into the applicator 26 and the answer to the query of block 308 is YES, at which time a teat is counted, or a count is initiated, at block 310. The controller 130 continues to monitor the current at block 312 to determine if or when the current drops below the Current Threshold and this routine query is made until the answer is YES at which time the programmed controller 130 loops back to block 308 to monitor whether the current exceeds the Current Threshold to determine if a second teat has been inserted into the applicator for cleaning.

Once all of the teats have been cleaned an operator should then release the switch 132 for the dry mode operation. At block 302 if the answer to the query of whether the switch 132 is pulled is NO, at block 314 a query is made as to the total number of teats washed has reached a wash set point. The controller 130 may be programmed to include a minimum wash set point, which may be for example three (3) because some cattle may only have three milk producing teats; however, the subject invention is not limited to minimum of three and the minimum number washes may be fewer or greater than three. If the operator has washed fewer than the minimum wash setpoint or threshold, then the answer to the query at block 314 is NO and the wash count is reset at block 316. As shown, once the wash count is reset, the controller 130 is programmed not to monitor the current until the switch 132 is pulled again for the next wash mode, which will be the next cow. Therefore, if the operator does not wash the minimum number of teats or meet the minimum wash count for a particular cow, that cow will not be counted as being properly prepped.

If the answer to the query at block 314 is YES, then the controller 130 monitors the current during the dry mode. At block 318, similar to the was mode, the query is made whether the current has reached or exceeds the Current Threshold, and that query is made until the answer is YES, at which time at block 320 a teat dry count is initiated. The controller 130 continues monitoring the current to determine if and when the current drops below the Current Threshold at block 322.

When the current drops below the Current Threshold, at block 324 the query is made whether the "Dry Count", or number of teats dried, is equal to or greater than the "Dry Count Setpoint" or minimum number of teats dried, which is preferably the same as the "Wash Count Setpoint" or minimum number of teats washed. Once the "Dry Count Setpoint" has been met at block 324, the controller 130 queries at block 326 whether the total number of wash counts plus dry counts is greater than zero ("0"), and if the total is greater than zero, then the counter 152 counts one cow having been properly prepped.

If for example, the operator does not meet the minimum "Dry Count Setpoint" and moves onto the wash mode for a next cow and pulls the switch 132 at block 302, then at block 304 the dry count 304 is reset. Then at block 308, the controller begins the routine to monitor the current and the wash count for a next cow. Thus, although the operator may have washed the minimum number of teats, the cow will not be counted at blocks 326 and 328, because the cow has not been properly prepped, because the operator did not meet the minimum "Dry Count Setpoint."

The system 10 may also include a database 154 in which data, representative of the above-described parameters associated with the teat cleaning, is stored. With respect to the above-described controller 130 programmed logic, when an operator has completed cleaning the cows in preparation for milking operation that operator may initiate a command via the input device 160 to transfer the total count to the database 154. Alternatively, each time a cow has been counted as being properly prepped that count may be transferred to the database 154. The database 154 may be configured to store the count according to the date of the cleaning operation, the length of time for the cleaning operation from start to completion, the length of time taken to clean each teat and each cow, and the name or other identifier information associated with the operator conducting a respective cleaning procedure. The data may be accessible during or after a milking operation using the above-referenced input mechanism 158, which may include a computer key pad, touch screen or the like. To that end, a computer with a display monitor may be linked to the controller 130 and access the database so the data can be accessed during or after milking operations. In addition, the data in the database 154 may be downloaded to a machine readable medium such as a disc, card etc.

In this manner, a dairy farm is able to monitor the teat cleaning procedures conducted during milking operations. For example, the dairy farm may be able to identify particular operators that are operating more or less efficiently than others. The data may be used to detect trends such as that towards the end of a shift fewer cows are being prepped properly.

As indicated above, the controller 130 may include, or be linked to a timer/clock 156 to monitor time parameters such as the length of time the system is in a wash mode during a shift to determine the amount of solution that is used during a shift. Also the amount of time taken to clean each teat and/or each cow may be monitored. This time related data may be stored in the database 154 and used to monitor the teat cleaning procedures.

It is known in the dairy industry to use RFID tags and readers to monitor animal health and schedule milking and fertilization to maximize productivity. Accordingly, the system 10 may be equipped with one or more RFID readers. Preferably, the reader is mounted to the applicator 26 and linked to the controller 130 and/or computer. Before a cow is cleaned for milking the RFID tag is read and the animal is identified; therefore, as data is generated while cleaning the cow, data relative whether or not that cow has been properly prepped during a cleaning procedure. Therefore the data can be parceled according to each cow. This data may be useful in determining the potential cause of mastitis in an individual cow.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A system for monitoring teat cleaning and disinfectant procedures before a milking operation is started, the system comprising:
    a disinfectant solution source;
    a hand-held applicator having a housing volume within which one or more brushes are positioned for engaging a teat of the milk-producing animal having been inserted in the volume for cleaning;
    a pump and conduit in fluid communication with the hand-held applicator and the disinfectant solution source, for delivering a disinfectant solution to the housing volume of the hand-held applicator;
    a controller, in electrical communication with the hand-held applicator and the pump, that is configured to initiate the actuation of the brushes and delivery of the disinfectant solution to the hand-held applicator as the brushes are actuated;
    wherein the applicator includes a switch mechanism in electrical communication with the controller and when the switch mechanism is actuated the controller activates the pump to control delivery of the disinfectant solution to the applicator and when released the controller deactivates the pump to discontinue the delivery of the disinfectant solution to the applicator and the controller being configured to control actuation of the brushes to rotate after the switch is released for a predetermined time duration without the disinfectant solution being supplied to the applicator;
    wherein the controller is further configured to monitor one or more teat cleaning parameters comprising a parameter indicative an amount of time the brushes are actuated for cleaning and drying the teats, a parameter indicative of an amount of time a teat or teats have been inserted in the applicator while the brushes are actuated, a parameter indicative of an amount of the time the disinfectant solution has been applied to the teats of cows in preparation for a milking operation, a parameter indicative of the number teats that are inserted into the housing volume when disinfectant solution is supplied to the applicator after the switch is actuated and/or the number of teats inserted into the volume of the applicator housing after the switch is released and during the predetermined time duration;
    wherein the controller is further configured to generate data representing the number of animals whose teats have been cleaned in preparation for a milking operation based on one or more of the monitored teat cleaning parameters; and,
    a database in which the data representing the number of animals whose teats have been cleaned in preparation for a milking operation is stored.

2. The system of claim 1, further comprising one or more readers for reading machine readable code affixed to each animal, the machine readable code having animal identification information thereon and the data related to the monitored parameters generated by the controller is associated with each animal identified for cleaning.

3. A method of monitoring teat cleaning and disinfecting procedures before a milking operation is started, the method comprising:
    providing a source of a disinfectant solution;
    delivering, for a first time duration, the disinfectant solution to a housing of a hand-held applicator having a teat inserted within a volume of the housing and the applicator having movable brushes in the housing element;
    simultaneously actuating the brushes for cleaning the teats in the presence of the solution for the first time duration;
    continuing to actuate the brushes for a second time duration after the first time duration has elapsed in order to dry the teats and during the second time duration the disinfectant solution is not delivered to the housing volume;
    monitoring one or more parameters associated with cleaning the teats wherein the parameters comprise a parameter indicative of an amount of time the brushes are actuated for cleaning and drying the teats, a parameter indicative of an amount of time a teat or teats have been inserted in the applicator while the brushes are actuated, a parameter indicative of an amount of the time the disinfectant solution has been applied to the teats of cows in preparation for a milking operation, a parameter indicative of the number teats that are inserted into the housing volume during the first time duration and/or the number of teats inserted into the volume of the applicator housing during the second time duration;
    generating data representing the number of animals whose teats have been cleaned in preparation for a milking operation based on one or more of the monitored teat cleaning parameters; and,
    storing in a database the data representing the number of animals whose teats have been cleaned in preparation for a milking operation is stored.

4. The method of claim 3, further comprising reading machine readable code affixed to each animal, the machine readable code having animal identification information thereon and the data related to the monitored parameters generated by the controller is associated with each animal identified for cleaning.

5. A system for monitoring teat cleaning or disinfecting procedures before a milking operation is started, the system comprising:
    a disinfectant solution source;
    a hand-held applicator having a housing volume within which one or more brushes are positioned for engaging a teat of the milk-producing animal having been inserted in the volume for cleaning;
    a pump and conduit in fluid communication with the hand-held applicator and the disinfectant solution source, for delivering a disinfectant solution to the housing volume of the hand-held applicator;
    a controller, in electrical communication with the hand-held applicator and the pump, that is configured to initiate the actuation of the brushes and delivery of the disinfectant solution to the hand-held applicator as the brushes are actuated during a teat washing mode;
    wherein the applicator includes a switch mechanism in electrical communication with the controller and when the switch mechanism is actuated the controller activates the pump to control delivery of the disinfectant solution to the applicator during the wash mode and when released the controller deactivates the pump to discontinue the delivery of the disinfectant solution to the applicator and the controller being configured to control actuation of the brushes to rotate after the switch is released for a predetermined time duration without the disinfectant solution being supplied to the applicator during a teat drying mode;
wherein the controller is further configured to monitor one or more teat cleaning parameters comprising a parameter indicative of the number teats that are inserted into the housing volume during the teat washing mode and/or the number of teats inserted into the volume of the applicator housing during the teat drying mode;
wherein the controller is further configured to generate data representing the number of animals whose teats have been cleaned in preparation for a milking operation based on one or more of the monitored teat cleaning parameters; and,
a database in which the data representing the number of animals whose teats have been cleaned in preparation for a milking operation is stored.

6. A method for monitoring teat cleaning or disinfecting procedures before a milking operation is started, the method comprising:
providing a source of a disinfectant solution;
delivering, for a first time duration, the disinfectant solution to a housing of a hand-held applicator having a teat inserted within a volume of the housing during a teat washing mode and the applicator having movable brushes in the housing volume;
simultaneously actuating the brushes for cleaning the teats in the presence of the solution delivered to the housing volume during the teat washing mode;
continuing to actuate the brushes for a second time duration during a teat drying mode after the teat washing mode has elapsed in order to dry the teats wherein the disinfectant solution is not delivered to the applicator during the teat drying mode;
monitoring, via a control logic, one or more parameters associated with cleaning the teats wherein the parameters comprise a parameter indicative of the number teats that are inserted into the housing volume during the teat washing mode and/or the number of teats inserted into the volume of the applicator housing during the teat drying mode;
generating data representing the number of animals whose teats have been cleaned in preparation for a milking operation based on one or more of the monitored teat cleaning parameters; and,
storing in a database the data representing the number of animals whose teats have been cleaned in preparation for a milking operation is stored.

* * * * *

UNITED STATES PATENT AND TRADEMARK OFFICE
Certificate

Patent No. 8,622,026 B1　　　　　　　　　　　　　　　　　　　　　　　Patented: January 7, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kevin Dole, Longwood, FL (US); and Larry Bilskie, Winter Springs, FL (US).

Signed and Sealed this Twenty-second Day of April 2014.

TIMOTHY D. COLLINS
*Supervisory Patent Examiner*
Art Unit 3644
Technology Center 3600